United States Patent
White

[15] 3,662,327
[45] May 9, 1972

[54] SEISMOMETER
[72] Inventor: Gale White, 6115 Crab Orchard, Houston, Tex. 77027
[22] Filed: Apr. 30, 1970
[21] Appl. No.: 33,472

[52] U.S. Cl. ....................................340/17, 73/71, 340/8 LF
[51] Int. Cl. .........................................................G01v 1/16
[58] Field of Search.......................340/17, 8 LF; 73/71, 71.2, 73/71.4

[56] References Cited

UNITED STATES PATENTS

| 2,041,710 | 5/1936 | Hayes | 340/17 X |
| 2,638,578 | 5/1953 | Piety | 340/17 |
| 2,717,369 | 9/1955 | Baudeen et al. | 340/17 |
| 2,038,101 | 4/1936 | Dudley | 340/17 |
| 2,405,226 | 8/1946 | Mason | 340/8 |

Primary Examiner—Malcolm F. Hubler
Assistant Examiner—R. Kinberg
Attorney—James F. Weiler, Jefferson D. Giller, William A. Stout, Paul L. Deverter, II, Dudley R. Dobie, Jr. and Henry W. Hope

[57] ABSTRACT

A temperature compensating seismometer in which a spring supports a mass movable in a case wherein the effect of movement of the mass due to temperature changes on the spring is avoided by providing a fluid bypass between the fluid on opposite sides of the mass in the case, the bypass being sized to allow passage of fluid during slow movement of the mass, but sized to retard movement of the fluid during fast movement of the mass. A seismometer which provides a mechanical magnification of the signals to be measured by making the cross-sectional area of the mass larger than the cross-sectional area of the differential pressure measuring transducer. An improved differential pressure transducer in a seismometer which provides improved sensitivity.

6 Claims, 11 Drawing Figures

Gale White
INVENTOR.

Gale White
INVENTOR.

Gale White
INVENTOR.

BY James F. Weiler
Jefferson O. Giller
William A. Stout
Paul L. DeVester II
ATTORNEYS 3,662,327

SEISMOMETER

BACKGROUND OF THE INVENTION

As indicated in applicant's application Ser. No. 306,796, filed Sept. 5, 1963, now abandoned, the usual method of detecting and measuring earth motion or movement is by the use of a mass or inertia member suspended or supported by a spring in a case. Suitable measuring means, such as a mechanical to electrical transducer, is used to sense or measure the position of the mass with respect to the case, the latter which is in contact with the earth. Thus, when the earth moves or vibrates, the mass tends to remain fixed while the case moves with the earth. The measuring means, generally electrical, delivers a signal corresponding to the earth movement due to the varying position or relative movement of the case with respect to the mass.

One feature of the present invention is the provision of a seismometer wherein as the mass moves relative to a case filled with a fluid, an increased pressure is created on one side of the mass while a decreased pressure is created on the second side of the mass and a pressure transducer is provided in communication with the fluid on both sides of the mass for measuring the pressure differential which is an indication of the relative movement of the mass to the case.

However, one problem with the general method of detecting earth movement with a mass and spring is the effect of temperature changes on the spring which is used to support the mass. Most spring material will weaken or lose strength as the temperature rises, which allows the mass to move downwardly relative to the case thereby giving an erroneous signal. In addition, careful design of the measuring equipment is required to keep the displacement of the mass due to normal ambient temperature changes to a range within the limits of the measuring component. This is particularly true in the case of low frequency seismometers where a long spring is required.

Furthermore, this limitation on the design of the measuring equipment, such as a transducer, restricts the efficiency of the transducer since the displacement of the mass due to temperature changes is usually much larger than the amplitude of the signals to be detected. Thus the measuring means, such as the mechanical-electrical transducer, must be capable of accepting large displacements, and yet be sensitive to small displacements.

SUMMARY

The present invention is directed to the provision of a temperature compensating seismometer which eliminates the effects of the movement of the mass due to temperature changes thereby avoiding error signals caused by temperature changes and also allowing the use of an efficient transducer that is designed to operate at the very small amplitude signals encountered by seismometers.

A still further object of the present invention is the provision of a seismometer which provides a mechanical magnification of the signals to be measured.

A still further object of the present invention is the provision of a seismometer in which the ratio of the cross-sectional area of the mass is larger than the cross-sectional area of a differential pressure transducer thereby providing a signal magnification.

Still a further object of the present invention is the provision of an improved differential pressure transducer which provides improved sensitivity for the measurement of the direction of movement as well as the displacement of the mass in relationship to the case in a seismometer.

A still further object of the present invention is the provision of an improved differential pressure transducer in which two sets of three condensers which vary in response to the differential pressure are arranged in T-circuits and are compared to provided a signal which indicates the direction and magnitude of the differential pressure.

DESCRIPTION OF THE PREFERRED EMBODIMENTS

Figure 1:
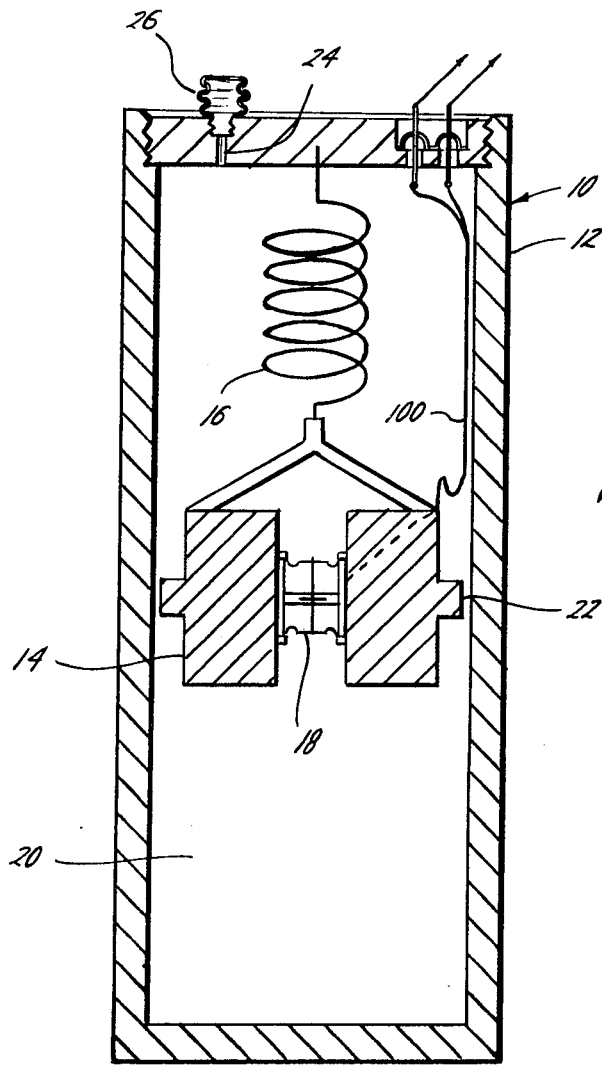
FIG. 1 is an elevational view, in cross section, illustrating a preferred embodiment of the present invention.
Figure 10:
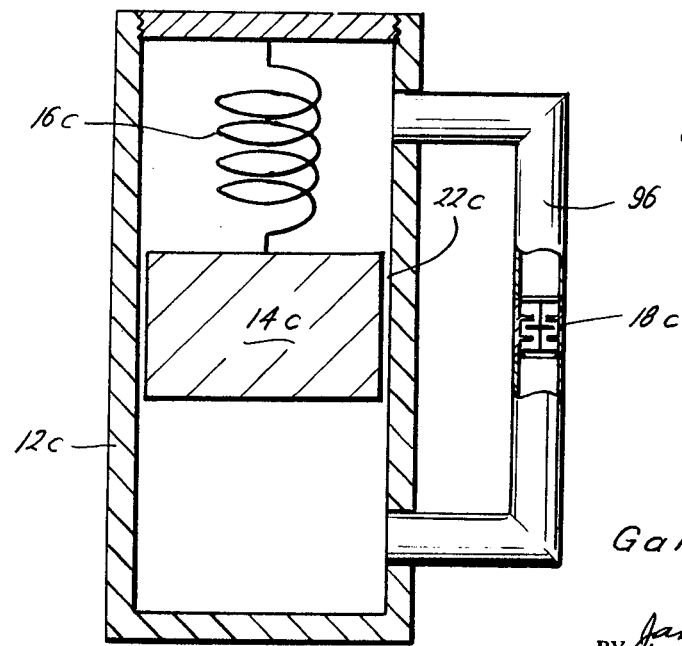
FIG. 10 is a schematic elevational view of still another modified form of the seismometer of the present invention.

Referring now to the drawings, and particularly to FIG. 1, the seismometer of the present invention is generally designated by the FIG. 10. Generally, the seismometer 10 includes a housing or case 12, an inertia member or mass 14 movable in the case 12 and suspended therein by a spring 16, and a pressure transducer 18 which measures the difference in pressure between the fluid above and below the mass 14. Generally, the case 12 is filled with a fluid 20 such as oil or silicon fluid although any suitable liquid, gas or even air may be utilized. In use, the case 12 is in contact with the earth and thus when the earth moves or vibrates the case 12 also moves or vibrates. The body of the mass 14 is slightly smaller than the inside of the case 12 and when the apparatus 10 is properly leveled the mass 14 will hang free from the spring 16 inside of the case 12. While the cross-sectional shape of the mass 14 and case 12 may be any desired shape, they are preferably round. However, the mass 14 tends to remain fixed when the case moves and therefore the relative movement between the mass 14 and the case 12 is an indication of the amount of and direction of the earth movement or vibration. When the case moves downward relative to the mass 14 the pressure in the fluid 20 above the mass 14 will increase but the pressure below the mass will decrease since the mass 14 tends to remain still and acts as a piston in the case 12. The differential pressure transducer 18 measures the pressure differential between the fluid above and below the mass 14 and produces a signal caused by this pressure difference which is an indication of the movement and direction of the mass 14 relative to the case 12. Preferably, the pressure transducer 18 is connected to and moves with the mass 14 thereby providing a quick response for any pressure changes in the fluid 20 and the case 12.

However, temperature changes will affect the strength of the spring 16 and most spring material will weaken as the temperature rises thereby causing the mass 14 to move downwardly in the case 12. This causes an erroneous output signal. In addition, because the amplitude of signals detected by the temperature changes is usually much larger than the amplitude of the signals to be detected the efficiency of the transducer is reduced as it must be capable of accepting large displacements due to the temperature changes, and yet be sensitive to the small displacements caused by the earth movements.

Therefore another feature of the present invention is the provision of a bypass or slow leak-off path or restriction 22 in communication with the fluid above and below the mass 14, here shown in FIG. 1 as being between the mass 14 and the case 12. The temperature changes, while of a large amplitude, occur relatively slow as compared with the earth movement or vibrations which are to be measured. Therefore, the provision of the bypass or leak-off path 22 provides for fluid communication between the space above and below the mass 14 so that pressure differentials caused by the temperature changes will, since they are relatively slow movements, flow through the small clearance 22 and thus equalize the pressures above and below the mass 14. This eliminates any pressure differential in the case 12 and on the pressure transducer 18 due to temperature changes. However, the fluid bypass 22 is sized so as to retard the quick passage of fluid between the space above and below the mass 14 whereby the signals to be measured of the earth movement or vibration, even though of a low amplitude, are at such a rate that a pressure differential will be created above and below the mass 14 which will be detected by the pressure transducer 18 before the pressure difference can be bled off through the bypass path 22.

Referring still to FIG. 1 it is noted that the motion magnification of the transducer is approximately the ratio of the square of the diameter of the mass 14 to the diameter of the pressure transducer 18. Therefore, it is desirable that the diameter or cross-sectional area of the mass 14 be large as compared to the cross-sectional area or diameter of the diaphragm in order to magnify the pressure differential and thus the detection signal.

In order to take care of the expansion and contraction of the fluid 20 in the case 12 due to temperature changes, a small outlet 24 and a reservoir is provided by a bellows 26.

While of course, any suitable differential pressure transducer may be utilized to measure the difference in pressure in the fluid above and below the mass 14, one preferred embodiment of such a transducer is shown in FIGS. 2–5. A transducer body 30, preferably cylindrical, is provided connected to the mass 14 and held in place by lock-ring 32. Upper and lower diaphragms 34 and 36 are located at opposite ends of the transducer and are exposed to the fluid pressure above and below the mass 14, respectively. A connecting rod 38 is connected between the diaphragms 34 and 36 and thus moves in response, similarly to the diaphragms, to pressure differentials above and below the mass 14. A pair of movable condenser plates 40 and 42 are connected to an insulating support 44 which is in turn connected and moves with the connecting rod 38. On opposite sides and facing the movable condenser plates 40 and 42 are two stationary condenser plates 46 and 48 which are suitably held in place by supports 50 and 52.

Figure 3:
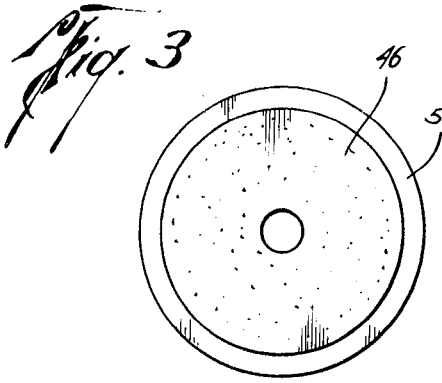
FIG. 3 is an enlarged elevational view illustrating the details of construction of one of the movable condenser plates used in the transducer of FIG. 2.
Figure 4:
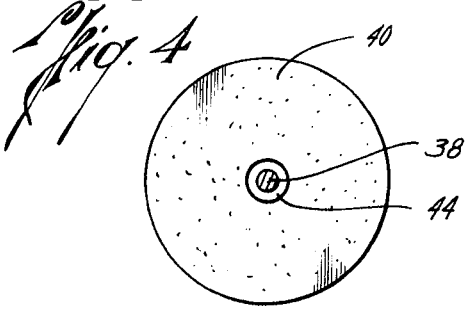
FIG. 4 is an enlarged elevational view of one of the fixed condenser plates used in the transducer of FIG. 2.

FIG. 3 shows a suitable shape for plate 46. Plate 48 is similar, and FIG. 4 shows a suitable shape for plate 40. Plate 43 will be similar.

Thus, the electrical capacity between the plates 40 and 46 and between the plates 42 and 48 has a direct relationship to the movement of the diaphragms 34 and 36. And, of course, the movement of the diaphragms will be related to the differential upper and lower pressures on either side of the mass 14. If the pressures are equal, the diaphragms will be in the center position and will in turn cause the capacity between the plates 40 and 46 and between the plates 42 and 48 to be equal. If the pressure above the mass 14 is larger than the pressure below the mass 14, the movable plates 40 and 42 will move downwardly and this will cause the spacing between the plates 42 and 48 to decrease and since capacity is inversely proportional to the spacing between the plates, the capacity between plates 42 and 48 will increase. At the same time, an inverse action takes place between the movable plate 40 and the upper fixed plate 46, which results in a decrease of electrical capacity between these plates.

Figure 5:
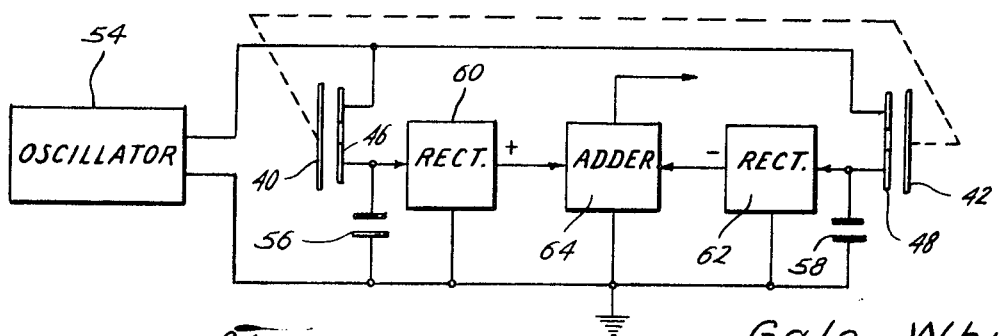
FIG. 5 is an electrical schematic diagram of a suitable electrical circuit for connection to the transducer of FIG. 3 for obtaining a suitable measurement of the differential pressure and thus the direction and movement of the differential pressure.

These changes in capacity may suitably be converted to an output signal by any desired electrical circuit. One such circuit is seen in FIG. 5 in which an oscillator 54 supplies a voltage, preferably at a high frequency, for example 1 mc., across the condenser formed by the plates 40 and 46 and the condenser formed by the plates 42 and 48 and the circuit condensers 56 and 58. Condensers 56 and 48 are fixed and are chosen to equal the capacity between the variable condensers when the system is at rest and the movable plates are equally spaced between the upper and lower plates 46 and 48. Rectifiers 60 and 62 are provided to produce opposite voltage outputs from the variable condensers formed between the plates 40 and 46 and 42 and 48, respectively. The output signals from the rectifiers 60 and 62 are connected to an adder 64 and will result in a zero output when the movable plates are at their normal position midway between the fixed plates 46 and 48. Now, as the movable plates move upwardly the capacitor formed by the plates 40 and 46 becomes larger and the capacitor formed by the plates 42 and 48 become smaller and due to the voltage dividing action of the condenser bridge circuit the rectifiers will deliver signals to the adder 64. Since the output from rectifier 60 is larger than the output from rectifier 62 the adder 64 will yield a positive signal output. This will be an indication of the magnitude and direction of the movement of the diaphragms 34 and 36. Similarly, a negative output signal is developed when the movable plates 40 and 42 move downwardly.

Figure 6:
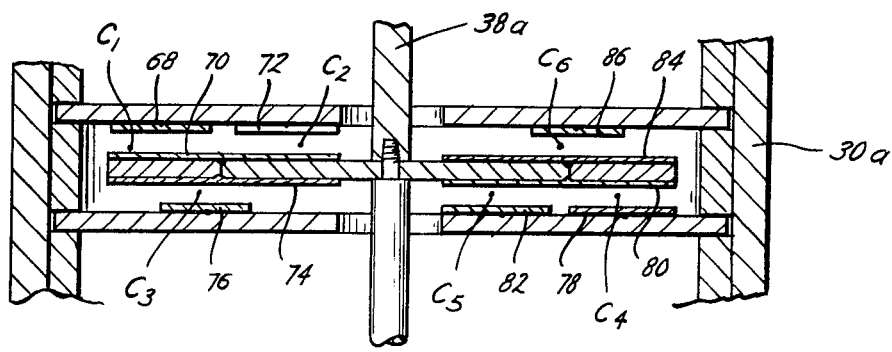
FIG. 6 is an enlarged fragmentary elevational view, in cross section, illustrating a modified embodiment of a transducer.
Figure 7:
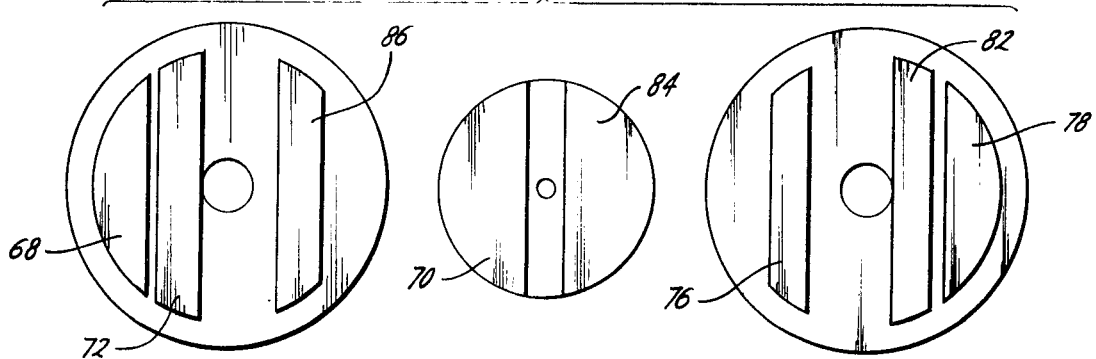
FIG. 7 is an elevational view, illustrating the details of construction of one of the condenser plates used in the transducer of FIG. 6.
Figure 8:
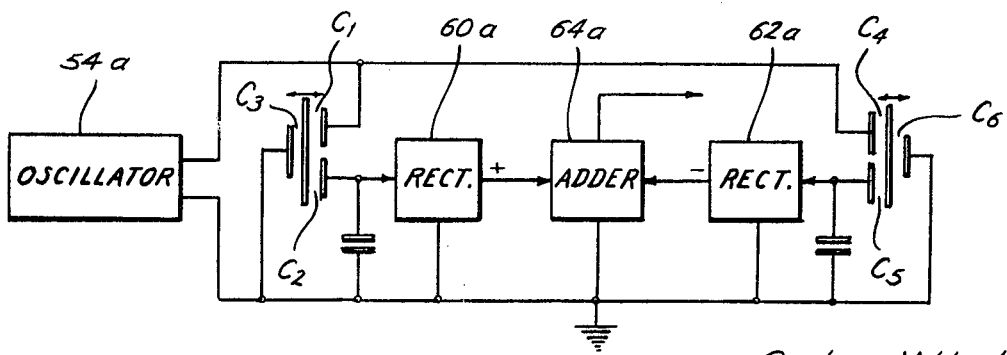
FIG. 8 is an electrical schematic diagram illustrating an electrical circuit which may be used in conjunction with the transducer of FIG. 6 to obtain suitable indication measurements.

Referring now to FIGS. 6, 7 and 8 a modified pressure transducer is shown wherein the capacitor plates are arranged to provide a greater sensitivity to displacement. For convenience of reference, the modification has the letter $a$ applied to the parts corresponding to those in FIGS. 2–5. The modification is to provide a network of capacitor elements all of which are controlled by the displacement of the diaphragms and which are arranged in a circuit to form a T-section capacitor attenuator. Thus, two sets of three capacitors each are provided between movable and fixed portions of the transducer. Thus, capacitors C1, C2 and C3 are formed with one set with plates 68 and 70 forming capacitor C1, plates 72 and 70 forming capacitor C2, and plates 74 and 76 forming capacitor C3. Similarly, a second set of capacitors C4, C5, and C6 are formed with plates 78 and 80 forming C4, 82 and 80 forming C5, and 84 and 86 forming C6. The two sets of capacitors are arranged in an electrical circuit as best seen in FIG. 8 in a manner similar to a push-pull circuit where one set will have an increase in attenuation while the other set has a decrease in attenuation for a given displacement of the diaphragms and the connecting rod 38$a$. For instance, if the spacing between the capacitors C1 and C2 decreases when the diaphragms and the connecting rod 38a moves upwardly, the spacing for capacitor C3 will increase and will cause a decrease in the attenuation of the oscillator voltage fed to rectifier 60$a$ which produces an increase in the positive signal from the adder 64$a$. At the same time, in the second set of capacitors, the spacing for C4 and C5 will increase and the spacing for C6 will decrease, which will cause an increase in the attenuation of the signal fed to the rectifier 62$a$, which produces a negative output. The result of this is a positive output signal from the adder 64$a$ which is an indication of the magnitude and direction of the movement of the mass 14 relative to the case 12. The reverse takes place if the pressure transducer is moved in the opposite direction.

Figure 1A:
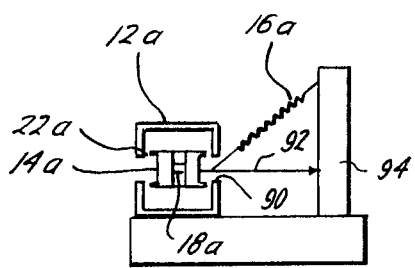
FIG. 1A is a schematic, elevational view of reduced size, in cross section, illustrating a modification of the present invention.
Figure 2:
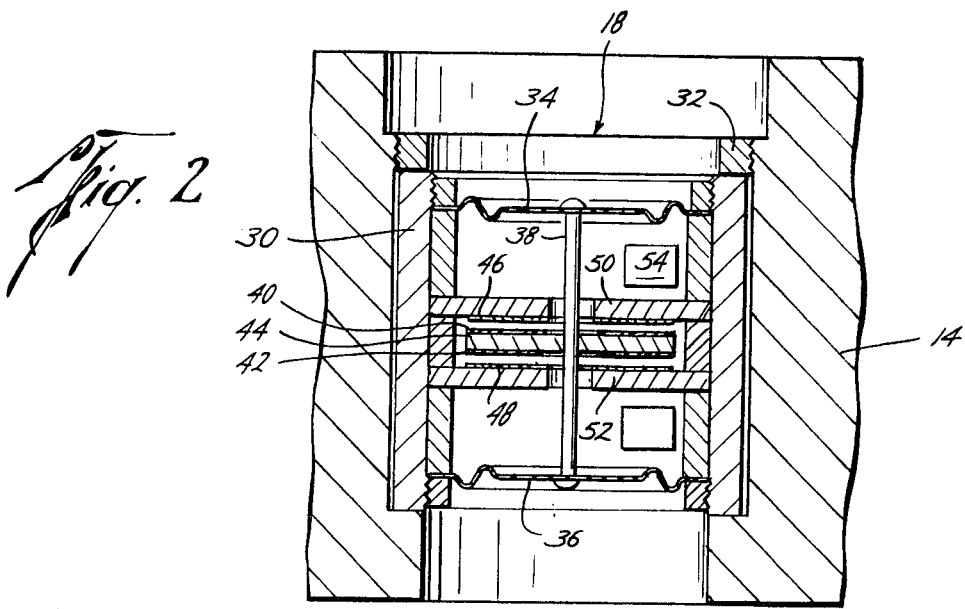
FIG. 2 is an enlarged fragmentary elevational view illustrating the details of construction of one type of suitable differential pressure transducer that may be used with the present seismometer.
Figure 9:
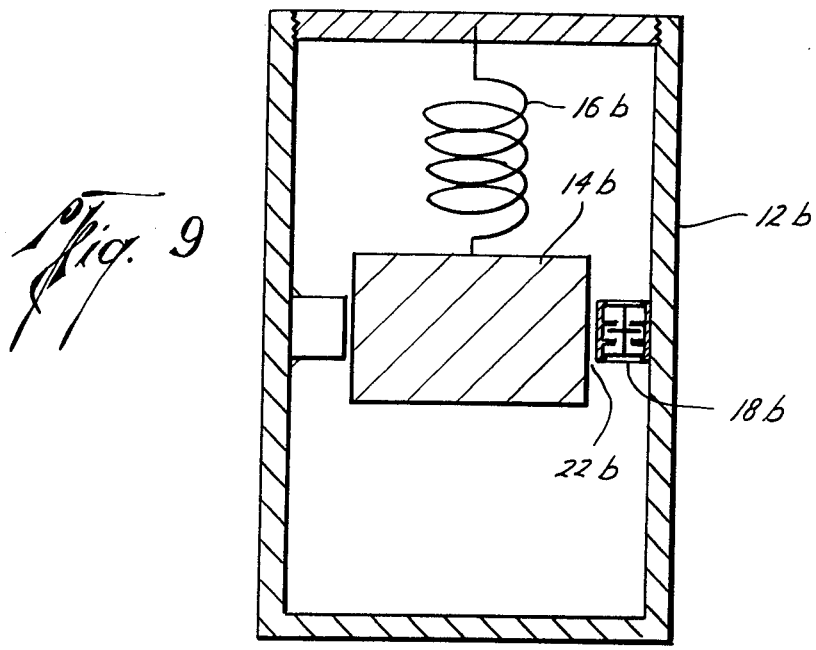
FIG. 9 is a schematic elevational view of a modified form of the seismometer of the present invention.

Of course, various modifications of the apparatus 10 may be provided. FIGS. 1A, 9 and 10 illustrate modifications out of the structure according to the invention, the letters $a$, $b$, and $c$, being applied to the parts corresponding to those in FIG. 1 for convenience of reference. In FIG. 1A, the case 12$a$ includes an opening 90 in the sidewall through which a lever 92 is provided and which acts in conjunction with the spring 16$a$ to support the mass 14 from a suitable support 94 and thus provides a somewhat more stable supporting structure for suspending the mass 14a in the case 12a. In this case the fluid on either side of the mass 14a would be a gas such as air.

In FIG. 9 the pressure transducer 18b is connected to the interior of the case 12b with the inertia member or mass 14b suspended adjacent the transducer 18b and spaced therein to provide the fluid bypass 22b between the mass 14b and the transducer 18b.

Referring now to FIG. 10 the piston 14c is suspended in the case 12c by the spring 16c and acts as a piston therein and is provided with a fluid bypass 22c, all as shown in FIG. 1. However, an external fluid communication line 96 if provided in which is positioned the pressure transducer 18c to measure the pressure differential on opposite sides of the mass 14c.

In use, and referring to FIG. 1, the mass 14 is suspended inside of the case 12 and the apparatus 10 is then leveled so that the mass 14 will hang from the spring 16 freely inside the case 12. Preferably, a liquid such as oil or silicon fluid fills all of the void space inside of the case 12 except for the interior of the pressure transducer 18. Thus, when the earth moves or vibrates the case 12 which rests on the earth moves with the earth while the mass tends to remain fixed and thus there is relative movement the mass 14 and the case 12. If the case 12 moves upwardly, the pressure will increase in the fluid above the mass and it will decrease in fluid below the mass as the mass acts as a piston between the two fluid compartments. The differential pressure transducer 18 produces a signal caused by this pressure difference and transmits it over the signal leads 100 to suitable outside signal pickup equipment (not shown).

However, as previously mentioned the strength of the spring 16 will change as the temperature changes thereby causing a vertical movement of the mass 14. In order to avoid erroneous readings caused by such movement and to allow the use of an efficient transducer which is designed to operate at very small amplitudes, usually desired for seismometers, a fluid bypass or leak-off path 22 is provided in communication between the space above and below the mass 14 to allow the pressure to equalize. Bypass 22 is sized so that slow movements of the mass caused by temperature changes allows the fluids to flow through the small path 22 and equalize the pressures on each side of the mass 14 and thereby avoid any pressure differential readings on the transducer 18 caused by temperature changes. However, the small size of the passageway 22 retards quick movement of the fluid about the mass 14, such as earth movements or vibrations being measured, thereby causing a pressure differential on the transducer 18.

And as previously described in connection with the pressure transducer shown either in FIGS. 2–5 or 6–8, movement of the diaphragms 34 and 36 in one direction causes movement of the connecting rod 38 or 38a to cause a change in the electrical capacity of the condensers mounted between the movable and the fixed elements of the pressure transducer which is converted to a voltage output signal which indicates the magnitude and direction of the movement. Thus in FIGS. 2–5 when the movable diaphragms 34 and 36 and connecting rod 38 moves upwardly the capacitor formed by the plates 40 and 46 becomes larger and the capacitor formed by the plates 42 and 48 becomes smaller whereby the positive signal delivered by the rectifier 60 to the adder 64 is greater than the signal delivered to the adder by the negative rectifier 62 thereby indicating the magnitude and direction of the pressure differential and thus of the mass 14.

Similarly, the two sets of condensers shown in FIGS. 6–8 operate to provide a negative and a positive signal which when balanced against each other shows the direction and magnitude of the movement. Thus, if the spacing between C1 and C2 decreases when the diaphragms 34 and 36 move upwardly the spacing for C3 will increase thereby causing an increase in the positive signal from the rectifier 68 to the adder 64a. At the same time, in the second set of condensers, the spacing for C6 will decrease which will cause a decrease in the signal fed from the rectifier 62a to the adder 64a which results in a positive output signal from the adder 64a which may then be transmitted through suitable electrical leads 100 (FIG. 1) to a suitable measuring apparatus (not shown).

Similarly, the seismometer embodiments shown in FIGS. 1A, 9, and 10 are suitably actuated to measure a pressure differential reading as the mass 14a, 14b and 14c move relative to the case 12a, 12b, and 12c, respectively. Similarly, fluid bypass or bleed-off passages 22a, 22b and 22c may be provided to provide a temperature compensating seismometer as previously described. Any suitable pressure transducer 18a, 18b, and 18c, respectively may be used, and the embodiments shown in FIGS. 2–5 and 6–8 produce a suitable output signal which provides a sensitive signal indicating both the direction and magnitude of the mass change.

It is also to be noted that the differential pressure transducers shown in FIGS. 2–5 and 6–8 may be used to detect and measure differential pressures in uses other than the seismometer of the present inventor and will provide an efficient and sensitive measurement.

The present invention, therefore, is well adapted to carry out the objects and attain the ends and advantages mentioned as well as others inherent therein.

What is claimed is:

1. A temperature compensating seismometer comprising,
   a case,
   a mass movable in said case,
   a spring supporting the mass in the case intermediate the ends of the case,
   fluid in said case on opposite sides of said mass,
   a fluid bypass communicating between the fluid on opposite sides of the mass and sized to allow the passage of fluid due to slow movement of the mass but sized to retard passage of fluid due to fast movement of the mass, and
   a pressure transducer in communication with the fluid on opposite sides of the mass for measuring the pressure differential on the opposite sides of the mass.

2. The invention of claim 1 wherein,
   the fluid bypass is between the mass and the case.

3. The invention of claim 1 wherein the transducer is within and connected to the mass.

4. The invention of claim 1 wherein the cross-sectional area of the mass is larger than the cross-sectional area of the pressure transducer.

5. A temperature compensating seismometer comprising,
   a case,
   a mass movable in said case,
   a spring supporting the mass in the case intermediate the ends of the case,
   fluid in said case on opposite sides of said mass,
   a fluid bypass communicating between the fluid on opposite sides of the mass and sized to allow the passage of fluid due to slow movement of the mass but sized to retard passage of fluid due to fast movement of the mass,
   a pressure transducer in communication with the fluid on opposite sides of the mass for measuring the pressure differential on the opposite sides of the mass,
   said pressure transducer including two diaphragms, the first in communication with fluid on one side of the mass, and the second in communication with the fluid on the second side of the mass,
   a pair of condenser plates connected to and movable with said diaphragms,
   a fixed condenser plate on each side of said pair of plates forming a pair of condensers whereby the electrical capacity of one of the condensers increases while the capacity of the other condenser decreases when the movable plates and diaphragms are moved, and
   an electrical measuring circuit including,
      an oscillator connected to the pair of condensers,
      a rectifier connected to the output of each condenser, and
      means comparing the outputs from said rectifiers.

6. A temperature compensating seismometer comprising,
   a case, a mass movable in said case, a spring supporting the mass in the case intermediate the ends of the case, fluid in said case on opposite sides of said mass, a fluid bypass communicating between the fluid on opposite sides of the mass and sized to allow the passage of fluid due to slow movement of the mass but sized to retard passage of fluid due to fast movement of the mass, a pressure transducer in communication with the fluid on opposite sides of the mass for measuring the pressure differential on the opposite sides of the mass, said pressure transducer including two diaphragms, the first in communication with fluid on one side of the mass, and the second in communication with the fluid on the second side of the mass, two sets of variable condensers connected to said diaphragms, the first set having two condensers in which the capacity increases and one condenser in which the capacity decreases when the diaphragms move in one direction, the second set having two condensers in which the capacity decreases and one condenser in which the capacity increases when the diaphragms move in said one direction, an electrical signal circuit including, an oscillator connected to each set of condensers, each set of condensers arranged in a separate T-circuit with the one condenser being in the leg of the T, and means for comparing the outputs of each set of condensers.

* * * * *